: 3,278,598
Patented Oct. 11, 1966

3,278,598
AMMONOLYSIS PROCESS
Kenneth H. Markiewitz, Wilmington, Del., assignor to Atlas Chemical Industries, Inc., Wilmington, Del., a corporation of Delaware
No Drawing. Filed July 18, 1963, Ser. No. 296,102
4 Claims. (Cl. 260—563)

This invention relates to the ammonolysis of alcohols and more particularly to an improved process for obtaining secondary and tertiary alkyl amines by the liquid phase ammonolysis of alcohols.

It is well known in the art that primary and secondary alcohols can be converted to amines by reaction with ammonia in the presence of catalysts, particularly in the presence of hydrogenation catalysts such as, for example, Raney metals, and that such conversion may be effected batch wise or in continuous process. All of the hydrogen atoms of ammonia are potentially replaceable by the alkyl radical of the reacting alcohol so that the reaction product is a mixture of primary, secondary, and tertiary amines. Recovery of secondary and tertiary amines from the mixed product can be readily effected by fractional distillation when the compounds involved are of low molecular weight, but when alcohols of higher molecular weight are aminated, resolution of the reaction product mixture into its component parts is impracticable. It is known that the proportion of secondary and tertiary to primary amines in the amination product is progressively increased as the proportion of ammonia to alcohol in the reaction mixture is decreased but, unfortunately, unless considerable excess of ammonia is employed objectionable side reactions, particularly reaction to form nitrile and amides, occur, decreasing the yield of desired product and increasing the difficulty of its recovery.

In accordance with the present invention, the process for ammonolysis of alcohols in the presence of Raney metal catalysts is modified to increase the proportion of secondary amine in the product. The said modification comprises the introduction of a minor proportion of a noble metal co-catalyst along with the Raney metal catalyst, which co-catalyst is a member of the group consisting of rhodium, ruthenium, and palladium. The co-catalyst may be in the form of finely divided metal, or may be supported on an inert carrier as is well known in the art. A preferred form of co-catalyst is carbon supported noble metal containing from 1 to 10% of active ingredient.

The process is applicable to the reaction of ammonia with any alcohol which undergoes ammonolysis in the presence of a hydrogenation catalyst. These alcohols include primary and secondary alkanols having at least two carbon atoms, glycols in which the hydroxyl groups are separated by at least six atoms, such as triethylene glycol or 1,6-hexanediol, also benzyl alcohol, cyclohexanol, and polyglycol ethers of alcohols, of amines, or of phenols, etc.

The effectiveness of the co-catalysts to increase the proportion of secondary amine in the ammonolysis product is shown in the numbered illustrative examples below which may be compared with Example A, which shows the product distribution to be expected under comparable conditions in the absence of the co-catalysts.

In all of the examples a one-gallon stainless steel stirred autoclave was charged with 800 milliliters of n-butanol, 220 grams of liquid ammonia, and 20 milliliters of a Raney nickel hydrogenation catalyst slurry in n-butanol. In Examples 1 through 3 there was also added the amount of co-catalyst shown in the table below. The reaction mixture was heated for 3 hours at 250° C. under autogenous pressure, cooled, siphoned from the autoclave, and filtered to remove the catalysts. The filtrate was fractionally distilled and the distillate analyzed. Pertinent data from the examples are tabulated below.

| Example | A | 1 | 2 | 3 |
|---|---|---|---|---|
| Co-catalyst | None | 5% Rh on carbon | 5% Ru on carbon | 5% Pd on carbon |
| Weight of co-catalyst in grams |  | 1 | 4 | 1 |
| Maximum pressure developed in autoclave in p.s.i. | 1,650 | 1,580 | 1,450 | 2,000 |
| Percent of unreacted n-butanol on that charged | 14.1 | 12.4 | 6 | 12 |
| Amine distribution: |  |  |  |  |
| Percent Primary | 75.5 | 50 | 50 | 50 |
| Percent Secondary | 24.5 | 50 | 50 | 50 |

The examples thus illustrate how the co-catalysts of the invention favor the production of secondary amines at the expense of primary amines. Thus the proportion of secondary amine in the control example is doubled when employing a co-catalyst in accordance with the invention without changing either the ammonia to alcohol ratio employed or the reaction time. Similarly, at other proportions of butanol to ammonia and in the amination of alcohols other than butanol, the use of Raney metal-noble metal catalyst mixture as illustrated above results in the formation of amination products richer in secondary amines than are obtained with the Raney metal itself.

The proportion of added co-catalyst may vary over a considerable range, amounts to furnish from 0.10% to 5.0% of noble metal on the weight of Raney metal being suitable.

What is claimed is:
1. In the Raney nickel catalyzed ammonolysis of primary and secondary alcohols with ammonia in the liquid phase, the improvement of having present in the reaction system from 0.10 to 5.0 percent by weight, based on the Raney nickel catalyst of a noble metal selected from the group consisting of rhodium, palladium and ruthenium as co-catalyst whereby the proportion of secondary amine to primary amine in the product is increased.
2. The process of claim 1 wherein the noble metal is supported on an inert carrier.
3. The process of claim 2 wherein the inert carrier is carbon.
4. In the Raney nickel catalyzed ammonolysis of primary and secondary alcohols with ammonia in the liquid phase the improvement of having present in the reaction system from 0.10 to 5.0 percent by weight, based on the Raney nickel catalyst of rhodium supported on carbon as a co-catalyst.

References Cited by the Examiner
UNITED STATES PATENTS 2,497,310  2/1950  Larson _____ 260—585
2,861,995  11/1958  MacKenzie.
3,068,290  12/1962  Litchtenberger et al. __ 260—585
3,128,311  4/1964  Shirley et al. _____ 260—585

OTHER REFERENCES
Stevenson: "Industrial and Engineering Chemistry," vol. 40, No. 9, pages 1584–5 (1948).

CHARLES B. PARKER, *Primary Examiner.*
DALE R. MAHANAND, ROBERT V. HINES,
*Assistant Examiners.*